(12) United States Patent
Mahapatro et al.

(10) Patent No.: US 11,356,635 B2
(45) Date of Patent: Jun. 7, 2022

(54) IMAGING APPARATUS USING MJPEG COMPRESSION METHOD

(71) Applicant: HANWHA TECHWIN CO., LTD., Seongnam-si (KR)

(72) Inventors: Sujit Kumar Mahapatro, Changwon-si (KR); Karthikeyan Kannaiyan, Changwon-si (KR)

(73) Assignee: Hanwha Techwin Co., Ltd., Seongnam-si (KR)

(*) Notice: Subject to any disclaimer, the term of this patent is extended or adjusted under 35 U.S.C. 154(b) by 1214 days.

(21) Appl. No.: 15/161,364

(22) Filed: May 23, 2016

(65) Prior Publication Data

US 2016/0360148 A1 Dec. 8, 2016

(30) Foreign Application Priority Data

Jun. 2, 2015 (KR) .......................... 10-2015-0078250

(51) Int. Cl.
*H04N 7/01* (2006.01)
*H04N 21/2343* (2011.01)
*H04N 19/00* (2014.01)

(52) U.S. Cl.
CPC ........... *H04N 7/0127* (2013.01); *H04N 19/00* (2013.01); *H04N 21/234363* (2013.01)

(58) Field of Classification Search
CPC ................. H04N 7/0127; H04N 19/00; H04N 21/234363
USPC ....................................................... 348/441
See application file for complete search history.

(56) References Cited

U.S. PATENT DOCUMENTS

| 9,143,759 | B2 | 9/2015 | Choi et al. | |
|---|---|---|---|---|
| 2006/0187340 | A1* | 8/2006 | Hsu | H04N 7/01 348/441 |
| 2007/0263720 | A1* | 11/2007 | He | H04N 19/124 375/240.03 |
| 2013/0057639 | A1* | 3/2013 | Ralston | H04L 12/1827 348/14.02 |

(Continued)

FOREIGN PATENT DOCUMENTS

| CN | 102316313 A | 1/2012 |
|---|---|---|
| CN | 103826121 A | 5/2014 |

(Continued)

OTHER PUBLICATIONS

Chinese Office Action dated Dec. 22, 2020 for Chinese application No. 201610387173.2.

(Continued)

*Primary Examiner* — John W Miller
*Assistant Examiner* — Omer Khalid
(74) *Attorney, Agent, or Firm* — McLean IP Global; Jason Y. Pahng

(57) ABSTRACT

An imaging apparatus includes at least one processor to implement: a re-sizer configured to re-size an image to a predetermined size, an encoder configured to encode the re-sized image, and a frame rate controller configured to calculate an actual bit rate of the encoded image for a preset period of time, compare a user-set target bit rate with the calculated actual bit rate, adjust a frame rate of the encoded image according to a result of the comparison, and output an encoded image signal at a user-set target bit rate irrespective of a complexity of the encoded image.

5 Claims, 18 Drawing Sheets

(56) References Cited

U.S. PATENT DOCUMENTS

| | | | | |
|---|---|---|---|---|
| 2013/0204927 A1* | 8/2013 | Kruglikov | ................. | G06F 9/54 |
| | | | | 709/203 |
| 2014/0092204 A1* | 4/2014 | Javadtalab | ........... | H04N 19/115 |
| | | | | 348/14.13 |
| 2014/0348246 A1* | 11/2014 | Fu | ...................... | H04N 21/2343 |
| | | | | 375/240.26 |
| 2015/0022626 A1* | 1/2015 | Nahla | .................. | H04N 19/597 |
| | | | | 348/14.09 |
| 2015/0139500 A1 | 5/2015 | Gerster et al. | | |
| 2015/0350654 A1* | 12/2015 | Chung | ................. | H04N 19/156 |
| | | | | 375/240.06 |

FOREIGN PATENT DOCUMENTS

| | | | |
|---|---|---|---|
| CN | 104270649 A | 1/2015 | |
| KR | 10-2011-0102609 A | 9/2011 | |
| KR | 1020120131649 A | 12/2012 | |
| KR | 10-2014-0072668 A | 6/2014 | |
| WO | 2014/057555 | 4/2014 | |

OTHER PUBLICATIONS

Korean Office Action dated May 28, 2021 for Korean application No. 10-2015-0078250.
Korean Office Action dated Nov. 23, 2021 for Korean application No. 10-2015-0078250.

\* cited by examiner

FIG. 7

(t1) —— S710
S711— ACTUAL BIT RATE FOR 1000 msec = 20 mbps
S712— 20 mbps ≥ USER-SET TARGET BIT RATE X 1.1? YES
S713— 20 mbps ≤ USER-SET TARGET BIT RATE X 0.9? NO
S714— FRAME RATE_new = FRAME RATE_old−1
S715— FRAME RATE _new = 9

(t2) —— S720
    ACTUAL BIT RATE FOR 1000 msec= 17 mbps
    17mbps ≥ 5.5mbps ? YES
    17mbps ≤ 4.5mbps ? NO
    FRAME RATE_new = FRAME RATE_old−1
    FRAME RATE_new = 8

⋮

(tn) —— S730
    ACTUAL BIT RATE FOR 1000 msec = 5 mbps
    5mbps ≥ 5.5mbps ? NO
    5mbps ≤ 4.5mbps ? NO
    Stable

FIG. 8

(t1) — S810
S811— Actual bitrate = 3mbps
S812— 3mbps ≥ 5.5mbps ?  NO
S813— 3mbps ≤ 4.5mbps ?  YES
S814— FR_new = FR_old+1
S815— FR_new = 5

(t2) — S820
    Actual bitrate = 4mbps
    4mbps ≥ 5.5mbps ?  NO
    4mbps ≤ 4.5mbps ?  YES
    FR_new = FR_old+1
    FR_new = 6

⋮

(tn) — S830
    Actual bitrate = 5mbps
    5mbps ≥ 5.5mbps ?  NO
    5mbps ≤ 4.5mbps ?  NO
    Stable

S1010— Actual bitrate = 20mbps
S1012— 20mbps ≥ 3.0 x1.1mbps (=33mpbs)? NO
S1013— 20mbps ≤ 3.0x0.9 (=27mbps) ? YES
S1020— 30fps < 30fps ? NO
S1030— 60% < 98% ? YES
S1040— QP_new = QF_old (ex. 60%)+1

⋮

(tn) — S1050

Actual bitrate = 30mbps
Actual framerate = 30fps
Final quality factor = 92%

FIG. 12

1st    1,000 msec —S1210
S1211— Actual Bitrate ≤ USER-SET TARGET BIT RATE × 0.9 ?  YES
S1212— SET TEMPORARY PATTERN : 0x0A 2nd   1,000 msec —S1220
S1221— Actual Bitrate ≥ USER-SET TARGET BIT RATE × 1.1 ?  YES
S1222— SET TEMPORARY PATTERN : 0x0B 3rd   1,000 msec —S1230
S1231— Actual Bitrate ≤ USER-SET TARGET BIT RATE × 0.9 ?  YES
S1232— SET TEMPORARY PATTERN : 0x0A 4th   1,000 msec —S1240
S1241— Actual Bitrate ≥ USER-SET TARGET BIT RATE × 1.1 ?  YES
S1242— SET TEMPORARY PATTERN : 0x0B

FIG. 13

RESOLUTION : 1920 × 1080
USER-SET TARGET FRAME RATE : 5 fps
USER-SET TARGET BIT RATE : 7 mbps
PRESET QP : 60%
PRESET PATTERN ⎡ 0x0A0B0A0B
⎣ 0x0B0A0B0A (t1) —— S1310
    BIT RATE : 8 mbps
    FRAME RATE : 4 fps
S1311— 8 mbps ≥ 7 mbps × 1.1 ( = 7.7 mbps)
S1312— TEMPORARY PATTERN 0x0AFFFFFF
S1313— REDUCE FRAME RATE : 4 fps → 3 fps (t2) —— S1320
    BIT RATE : 6 mbps
    FRAME RATE : 3 fps
S1321— 6 mbps ≤ 7 mbps × 0.9 ( = 6.3 mbps)
S1322— TEMPORARY PATTERN 0 x0A0BFFFF
S1323— INCREASE FRAME RATE : 3 fps → 4 fps (t3) —— S1330
    BIT RATE : 8 mbps
    FRAME RATE : 4 fps
S1331— 8 mbps ≥ 7.7 mbps
S1332— TEMPORARY PATTERN 0x0A0B0AFF
S1333— REDUCE FRAME RATE : 4 fps → 3 fps (t4) —— S1340
    BIT RATE : 6 mbps
    FRAME RATE : 3 fps
S1341— 6 mbps ≤ 6.3 mbps
S1342— TEMPORARY PATTERN 0x0A0B0A0B
S1343— FINAL FRAME RATE : 3 fps

IMAGING APPARATUS USING MJPEG COMPRESSION METHOD

CROSS-REFERENCE TO RELATED APPLICATION

This application claims priority from Korean Patent Application No. 10-2015-0078250, filed on Jun. 2, 2015 in the Korean Intellectual Property Office, the disclosure of which is incorporated herein by reference in its entirety.

BACKGROUND

1. Field

One or more exemplary embodiments relate to an imaging apparatus using an MJPEG compression method.

2. Description of the Related Art

Motion JPEG (MJPEG) is a video compression method in which each video frame is compressed separately as a JPEG image. When such a JPEG image is transmitted, the quality of the JPEG image may be maintained but a high bit rate may be required for the transmission.

If the bit rate is too high, network transmission traffic may occur and a storage space for storing a video frame may not be sufficient.

SUMMARY

One or more exemplary embodiments provide an imaging apparatus that may maintain image quality and satisfy bit rate condition requested by a user, by dynamically controlling MJPEG encoder's quality factor and frame rate.

According to one or more exemplary embodiments, there is provided an imaging apparatus including at least one processor to implement: a re-sizer configured to re-size an image to a predetermined size; an encoder configured to encode the re-sized image; and a frame rate controller configured to calculate an actual bit rate of the encoded image for a preset period of time, compare a user-set target bit rate with the calculated actual bit rate, adjust a frame rate of the encoded image according to a result of the comparison, and output an encoded image signal at a user-set target bit rate irrespective of a complexity of the encoded image.

The frame rate controller may be further configured to adjust the frame rate to a user-set target frame rate.

The imaging apparatus may further include a quality factor controller configured to adjust a motion JPEG (MJPEG) quality factor until the actual bit rate reaches the user-set target bit rate in response to an actual frame rate of the encoded image reaching the user-set target frame rate and the actual bit rate not reaching the user-set target bit rate.

When the frame rate controller may be further configured to, in response to the actual bit rate being greater than the user-set target bit rate, sequentially reduce the frame rate of the encoded image.

The imaging apparatus may further include a quality factor controller configured to sequentially reduce an MJPEG quality factor to a minimum quality factor until the actual bit rate reaches the user-set target bit rate in response to an actual frame rate of the encoded image being reduced to the user-set target frame rate and the actual bit rate exceeding the user-set target bit rate.

When the frame rate controller is further configured to, in response to the actual bit rate being less than the user-set target bit rate, sequentially increase the frame rate of the encoded image.

The imaging apparatus may further include a quality factor controller configured to sequentially increase an MJPEG quality factor until the actual bit rate reaches the user-set target bit rate in response to an actual frame rate of the encoded image being increased to the user-set target frame rate and the actual bit rate not reaching the user-set target bit rate.

When the frame rate controller may be further configured to, in response to the actual bit rate being greater than the user-set target bit rate by X %, reduce the frame rate of the encoded image. X may be a natural number.

When the frame rate controller may be further configured to, in response to the actual bit rate being less than the user-set target bit rate by X %, increase the frame rate of the encoded image. X may be a natural number.

The frame rate controller may be further configured to generate a temporary pattern in response to a result of the comparison satisfying a preset condition whenever the user-set target bit rate is compared with the actual bit rate. The frame rate controller may further be configured to generate a dynamic frame rate by adjusting the frame rate of the encoded image according to the result of the comparison. The frame rate controller may be further configured to perform pre-processing on the encoded image at the actual bit rate and the dynamic frame rate in response to the temporary pattern being equal to a preset pattern.

The preset condition may be satisfied when the actual bit rate is greater than the user-set target bit rate by X % or the actual bit rate is less than the user-set target bit rate by Y %. Each of X and Y may be a natural number.

According to an aspect of another exemplary embodiment, there is provided a method performed by an imaging apparatus to improve motion JPEG (MJPEG) quality, including: re-sizing, by a re-sizer, an image to a predetermined size; encoding, by an encoder, the re-sized image; calculating, by a frame rate controller, an actual bit rate of the encoded image for a preset period of time; comparing, by the frame rate controller, a user-set target bit rate with the calculated actual bit rate; adjusting, by the frame rate controller, a frame rate of the encoded image according to a result of the comparison; and outputting, by the frame rate controller, an encoded image signal at a user-set target bit rate irrespective of a complexity of the encoded image.

The method may further include adjusting, by the frame rate controller, an MJPEG quality factor until the actual bit rate reaches the user-set target bit rate in response to an actual frame rate of the encoded image reaching the user-set target frame rate and the actual bit rate not reaching the user-set target bit rate.

When a scene of an image received from the imaging apparatus changes from normal to complex, the imaging apparatus may reduce a frame rate in order to maintain image quality and maintain a user-set target bit rate set, thereby improving MJPEG quality.

When a scene of an image received from the imaging apparatus changes from complex to normal, the imaging apparatus may increase a frame rate in order to maintain image quality and maintain a user-set target bit rate, thereby improving MJPEG quality.

When a scene of an image received from the imaging apparatus changes from normal to simple, the imaging apparatus may increase a frame rate in order to maintain image quality and maintain a user-set target bit rate. In this case, when the increased frame rate reaches a user-set target frame rate, the imaging apparatus may additionally increase a preset quality factor, thereby improving MJPEG quality.

When a scene of an image received from the imaging apparatus changes from complex to simple, the imaging apparatus may increase a frame rate in order to maintain image quality and maintain a user-set target bit rate. In this case, when the increased frame rate is less than a user-set target frame rate, the imaging apparatus may additionally increase a preset quality factor, thereby improving MJPEG quality.

BRIEF DESCRIPTION OF THE DRAWINGS

The above and/or other aspects will be more apparent by describing certain exemplary embodiments, with reference to the accompanying drawings, in which:

FIGS. 7 and 8 are detailed charts for explaining the method of improving MJPEG quality of FIG. 6, by increasing or reducing a frame rate according to an exemplary embodiment;

FIG. 10 is a detailed chart for explaining the method of improving MJPEG quality of FIG. 9, by controlling a frame rate and a quality factor according to an exemplary embodiment;

FIGS. 12 and 13 are charts for explaining a method performed by an imaging apparatus to process an input bitstream by using a bitstream and a frame rate when a temporary pattern generated when a preset condition is satisfied is compared with a preset pattern and is determined to be the same as the preset pattern according to another exemplary embodiment.

DETAILED DESCRIPTION

Figure 1:
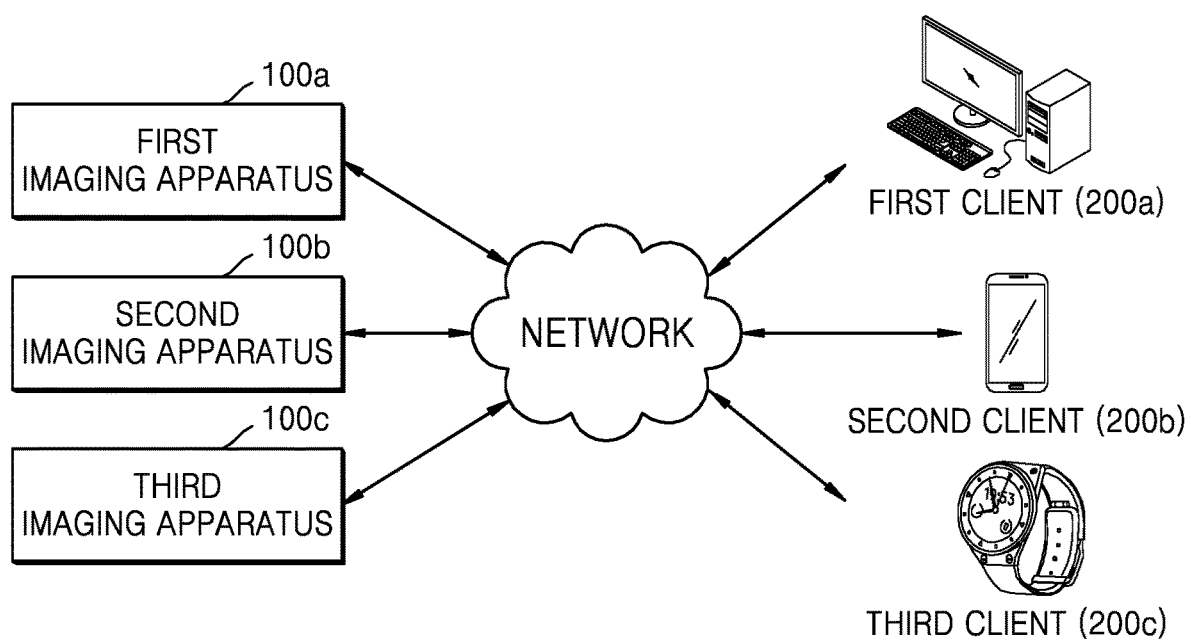
FIG. 1 is a diagram of a network system in which an imaging apparatus operates according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

FIG. 1 is a diagram of a network system in which an imaging apparatus operates according to an exemplary embodiment.

One or more imaging apparatuses may communicate with one or more clients in a wired or wireless manner. In an exemplary embodiment, a plurality of imaging apparatuses, for example, first through third imaging apparatuses 100a, 100b, and 100c, may communicate with one first client 200a. In another exemplary embodiment, the first imaging apparatus 100a and a plurality of clients may communicate with each other in a wired or wireless manner.

Figure 2:
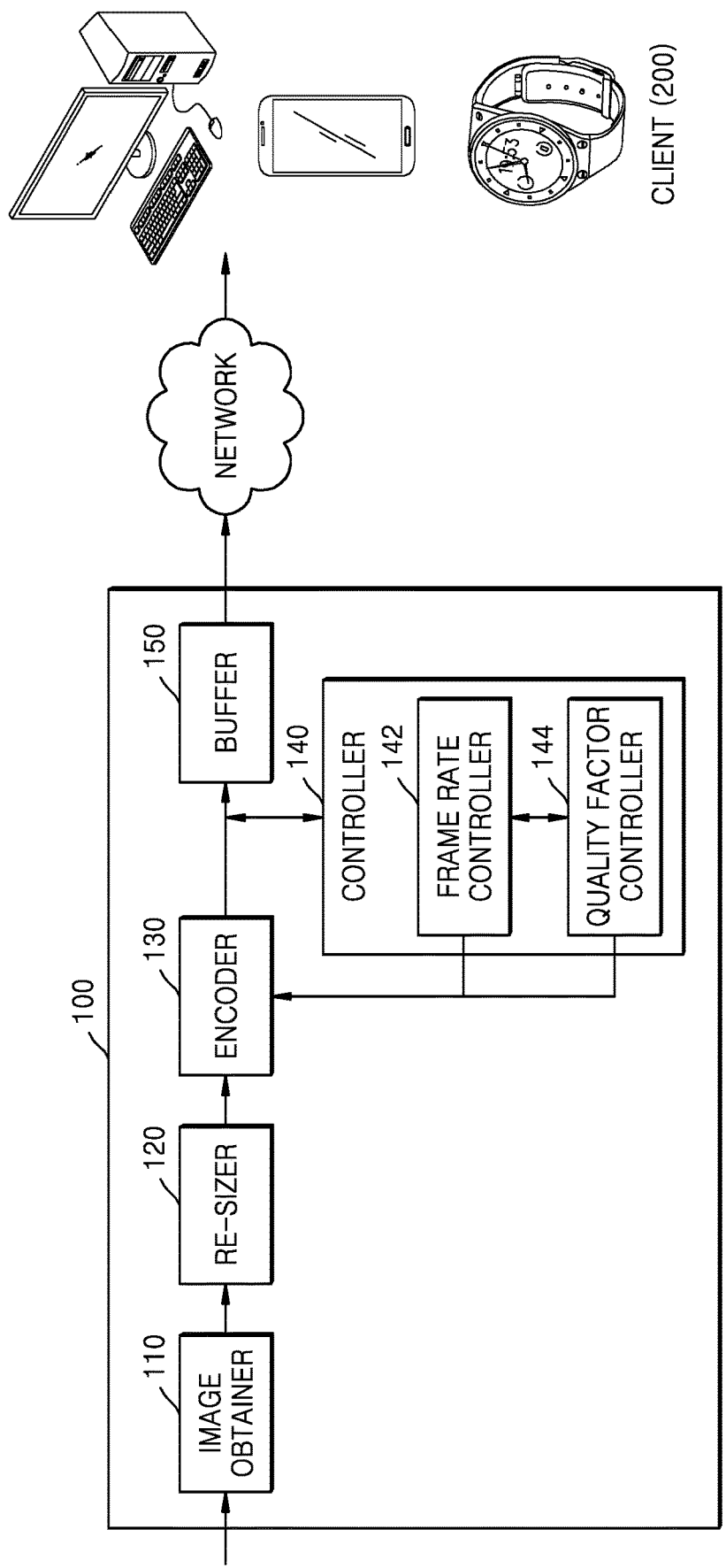
FIG. 2 is a diagram illustrating a configuration of an imaging apparatus according to an exemplary embodiment.

FIG. 2 is a diagram illustrating a configuration of an imaging apparatus 100 according to an exemplary embodiment.

The imaging apparatus 100 may be any terminal having an imaging function, for example, a camera, a camcorder, a mobile phone, a smartphone, a personal computer (PC), a network video recorder (NVR), a digital video recorder (DVR), a laptop computer, a handheld device, a mobile terminal, or a tablet PC. The imaging apparatus 100 may communicate with a client in a wired or wireless manner to transmit an obtained monitored image to the client and to receive a request from the client.

FIG. 1 illustrates elements of the imaging apparatus 100 that perform an MJPEG compression method to provide a monitored image at a user-set target bit rate. However, the image apparatus 100 may include additional elements of a general camera.

The imaging apparatus 100 includes an image obtainer 110, a re-sizer 120, an encoder 130, and a controller 140. The image obtainer 110 may be implemented by a communication interface such as transceiver, or a video camera. The re-sizer 120, the encoder 130, and the controller 140 may be implemented by one or more microprocessors. The controller 140 includes a frame rate controller 142 and a quality factor controller 144. In addition, the imaging apparatus 100 may further include a user interface through which a user's manipulation signal is input, a program storage that temporarily stores data of an input image, data for calculations, and a process result, and a buffer 150 that stores an algorithm that is retrieved to operate the imaging apparatus 100 in addition to configuration data, and an image file.

The re-sizer 120 may re-size an image of a subject obtained by the image obtainer 110 to a predetermined size. Zero padding that sets a high-frequency discrete cosine transform (DCT) coefficient in a DCT domain to 0 may be used as a method of re-sizing an input image. However, the method of re-sizing an input image is not limited to zero padding, and may be any of various other re-sizing methods.

The encoder 130 may perform encoding on the re-sized image through DCT, quantization, or variable length coding.

The controller 140 may output an encoded image signal by using a user-set target bit rate irrespective of a complexity of an encoded image obtained by the encoder 130.

To this end, the frame rate controller 142 compares the user-set target bit rate (see FIGS. 3 and 4) with an actual bit rate of the encoded image that is calculated for a preset period of time and reduces or increases a frame rate of the encoded image according to a result of the comparison.

When the actual bit rate of the encoded image does not reach the user-set target bit rate, or when the frame rate reaches a user-set target frame rate and thus the frame rate controller 142 may no longer adjust the frame rate, the quality factor controller 144 reduces or increases a quality factor QP_default preset by a user in a range from a maximum quality factor QP_max to a minimum quality factor QP_min until the actual bit rate of the encoded image reaches the user-set target bit rate.

In an exemplary embodiment, when the actual bit rate of the encoded image that is calculated for, for example, 1000 msec, is greater than the user-set target bit rate, the frame rate controller 142 sequentially reduces the frame rate of the encoded image.

In this case, when an actual frame rate of the encoded image is reduced to the user-set target frame rate but the actual bit rate of the encoded image exceeds the user-set target bit rate, the quality factor controller 144 may additionally sequentially reduce an MJPEG quality factor to the minimum quality factor QP_min until the actual bit rate of the encoded image reaches the user-set target bit rate.

In another exemplary embodiment, when the actual bit rate of the encoded image that is calculated for, for example, 1000 msec, is less than the user-set target bit rate, the frame rate controller 142 increases the frame rate of the encoded image.

In this case, when the actual frame rate of the encoded image is increased to the user-set target frame rate but the actual bit rate of the encoded image does not reach the user-set target bit rate, the quality factor controller 144 additionally increases the MJPEG quality factor to the maximum quality factor QP_max until the actual bit rate of the encoded image reaches the user-set target bit rate.

In an exemplary embodiment, a method of reducing or increasing a bit rate, a frame rate, and a quality factor may be modified in various ways to, for example, a method of sequentially reducing or increasing them, a method of reducing or increasing them in a preset ratio, or a method of dynamically reducing or increasing them.

Figure 3:
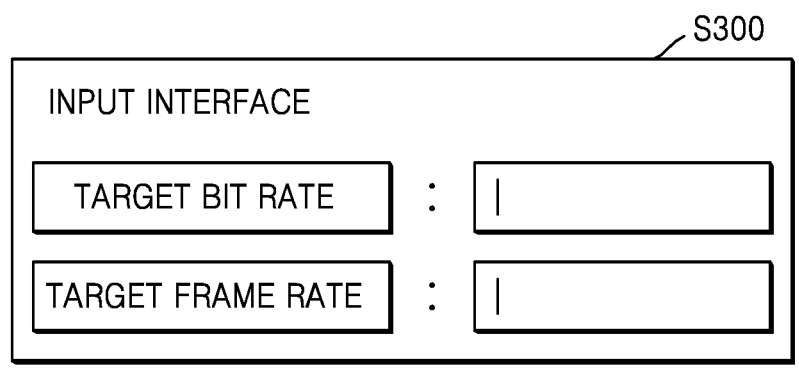
FIGS. 3 and 4 are diagrams for explaining a process of providing an input interface for user settings to a client according to an embodiment.
Figure 4:
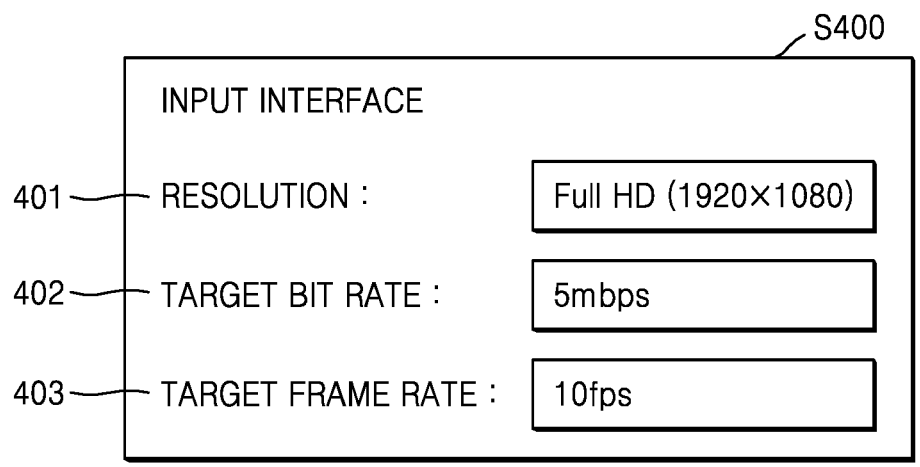

FIGS. 3 and 4 are diagrams for explaining a process of providing an input interface for user settings to a client according to an exemplary embodiment.

An imaging apparatus may receive a streaming based on settings that are input by a user that is a client through input interfaces S300 and S400. In this case, the imaging apparatus may receive default values of parameters such as a resolution 401, a target bit rate 402, and a target frame rate 403 from the user.

In an exemplary embodiment, when the user respectively sets the resolution 401, the target bit rate 402, and the target frame rate 403 to FullHD (1920*1080), 5 mbps, and 10 fps as shown in FIG. 4 or when there is a streaming request from the user, a method performed by the imaging apparatus to improve MJPEG quality is performed as follows.

Figure 5A:
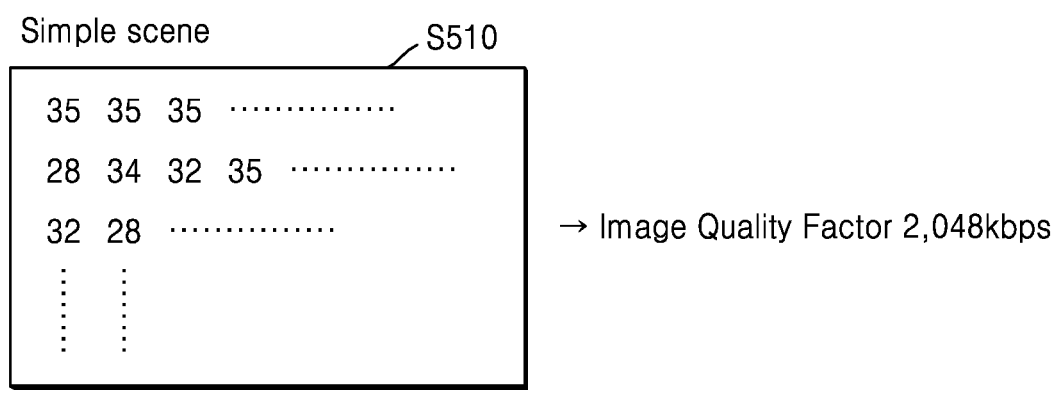
FIGS. 5A and 5B are diagrams illustrating a simple image and a complex image according to an exemplary embodiment.
Figure 5B:
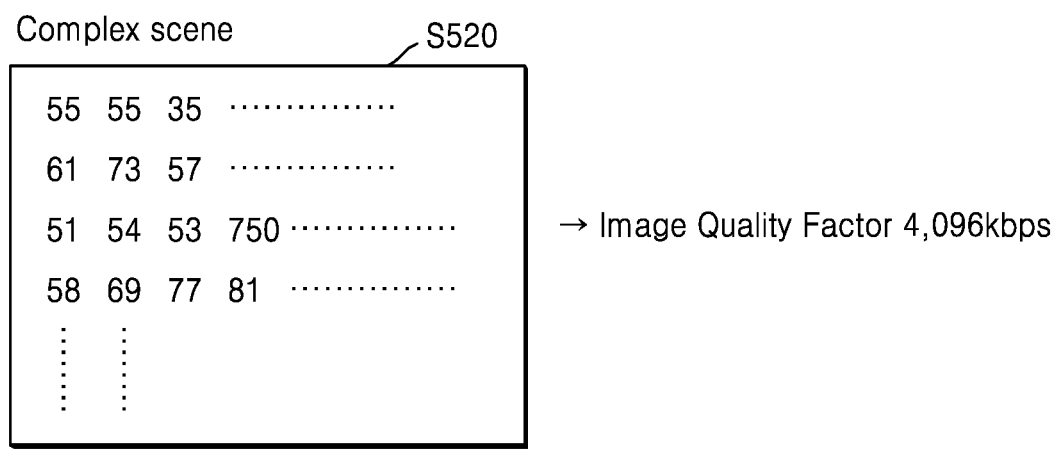

FIGS. 5A and 5B are diagrams illustrating a simple image and a complex image according to a complexity of an image according to an exemplary embodiment.

In an exemplary embodiment, an imaging apparatus may divide an input image into a simple image, a normal image, and a complex image based on the number of bits used during encoding.

In an exemplary embodiment, the simple image refers to an image requiring a minimum bit rate in order to maintain quality. The normal image refers to an image requiring an average bit rate in order to main quality. The complex image refers to an image requiring a bit rate exceeding the average bit rate in order to maintain quality. The average bit rate may be preset, may be statistically set, or may be set by a manager.

In general, when a quality factor of 1 indicates lowest quality, a quality factor of about 50 to 60 indicates average quality, and a quality factor of 99 indicates highest quality. A user may set a maximum quality factor and a minimum quality factor in a range from 1 to 99.

In an exemplary embodiment, FIG. 5A illustrates quality factors used to encode a simple image S510. About 2,048 kbps are required to encode one frame. FIG. 5B illustrates quality factors used to encode a complex image S520. About 4,096 kbps are required to encode one frame.

In another exemplary embodiment, when a bit rate detected for 1000 msec in a received bitstream exceeds a preset value, the imaging apparatus may regard an image included in the bitstream as a complex image. A case where the detected bit rate exceeds the preset value may include a case where the detected bit rate is 20% greater than a user-set target bit rate.

Also, when a bit rate detected for 1000 msec in a received bitstream is less than a preset value, the imaging apparatus may regard an image included in the bitstream as a simple image. A case where the detected bit rate is less than the preset value may include a case where the detected bit rate is 20% less than a user-set target bit rate.

Figure 6:
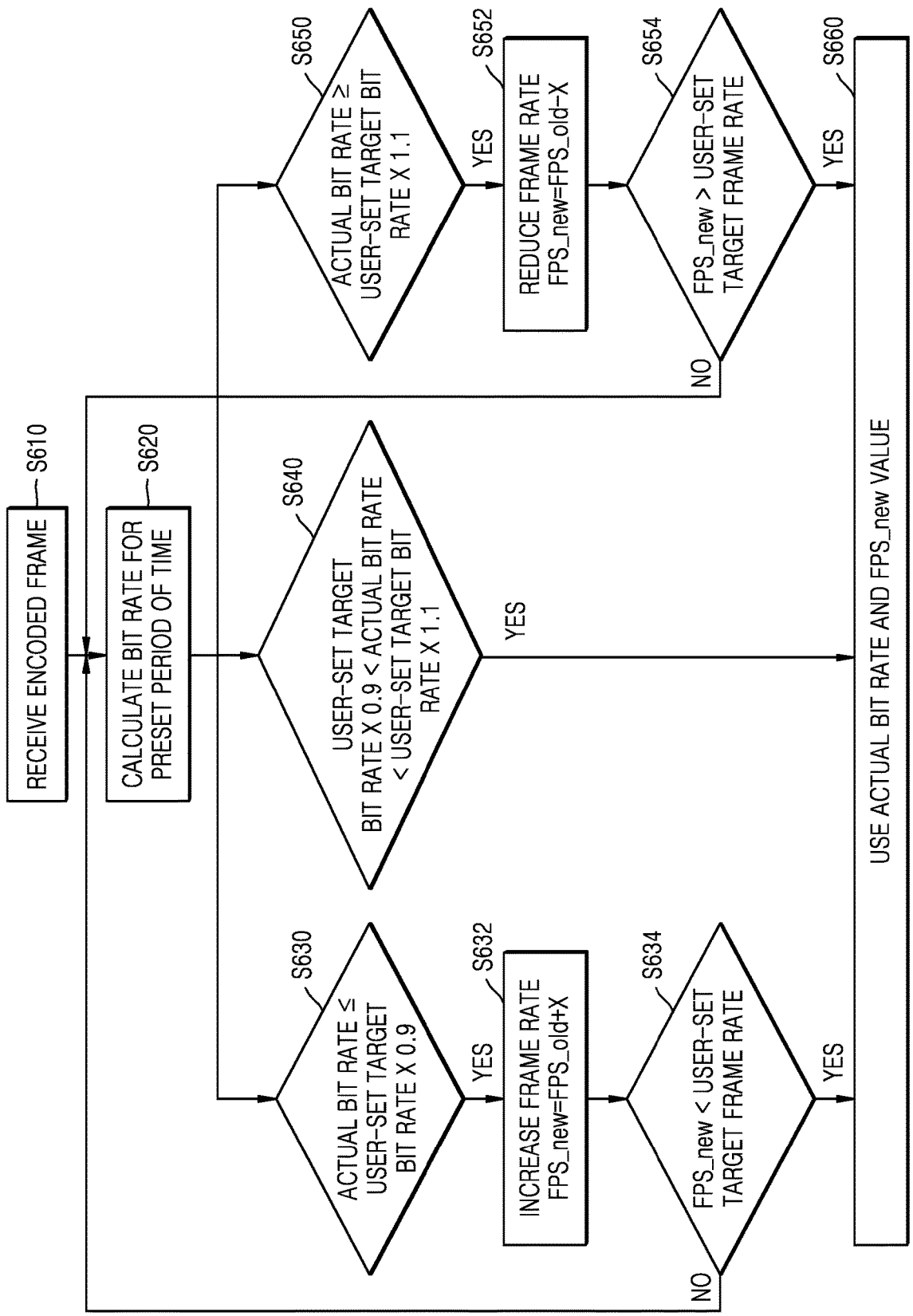
FIG. 6 is a flowchart of a method performed by an imaging apparatus to improve MJPEG quality by controlling a frame rate according to an exemplary embodiment.

FIG. 6 is a flowchart of a method performed by an imaging apparatus to dynamically improve MJPEG quality according to an exemplary embodiment.

In FIG. 6, an initial value of a frame rate FRS_new is the same as a frame rate FRS_old, and the frame rate FRS_old denotes a frame rate of an encoded image that is calculated for a preset period of time.

In an exemplary embodiment, the imaging apparatus 100 receives an encoded image and calculates an actual bit rate of the encoded image for a preset period of time, for example, 1000 msec (operations S610 and S620).

Next, it is determined whether the actual bit rate is within a margin range of +/−10% of a user-set target bit rate (operations S630, S640, and S650).

When it is determined that the actual bit rate is greater than 90% of the user-set target bit rate and less than 110% of the user-set target bit rate (operation S640), the imaging apparatus transmits an encoded bitstream to a user at a frame rate that is calculated for a preset period of time and the actual bit rate.

In an exemplary embodiment, when it is determined that the actual bit rate is less than or equal to 90% of the user-set target bit rate (operation S630), the imaging apparatus increases the frame rate to by a preset value X, wherein X is a natural number (operation S632).

The newly set frame rate RFS_new is as follows.

$$FRS\_new = FRS\_old + X$$

It is determined whether the newly set frame rate FRS_new reaches a user-set target frame rate (operation S634). When it is determined that the newly set frame rate RFS_new does not reach the user-set target frame rate, the imaging apparatus calculates a bit rate of the encoded image for a preset period of time (operation S620).

When it is determined that the newly set frame rate FRS_new reaches the user-set target frame rate, the imaging apparatus 100 transmits the encoded bitstream to the user at the frame rate and the actual bit rate.

In an exemplary embodiment, when it is determined that the actual bit rate is greater than or equal to 110% of the user-set target bit rate (operation S650), the imaging apparatus 100 reduces the frame rate by the preset value X, wherein X is a natural number (operation S652). The operation S652 will be explained below with reference to FIG. 8 in further detail.

The newly set frame rate FRS_new is as follows.

FRS_new=FRS_old−X

It is determined whether the newly set frame rate FRS_new reaches the user-set target frame rate (operation S654). When it is determined that the newly set frame rate FRS_new does not reach the user-set target frame rate, the imaging apparatus calculates a bit rate of the encoded image for a preset period of time (operation S620), which will be explained below with reference to FIG. 7.

When it is determined that the newly set frame rate FRS_new reaches the user-set target frame rate, the imaging apparatus 100 transmits the encoded bitstream to the user at the frame rate and the actual bit rate.

FIGS. 7 and 8 are detailed charts for explaining the method of improving MJPEG quality by increasing or reducing a frame rate of FIG. 6 according to an exemplary embodiment.

An imaging apparatus 100 compares an actual bit rate with a user-set target bit rate, and when the actual bit rate exceeds a margin range of +/−10% of the user-set target bit rate, sequentially increases or reduces a frame rate until the frame rate is within the margin range of +/−10% of a user-set target frame rate.

Figure 9A:
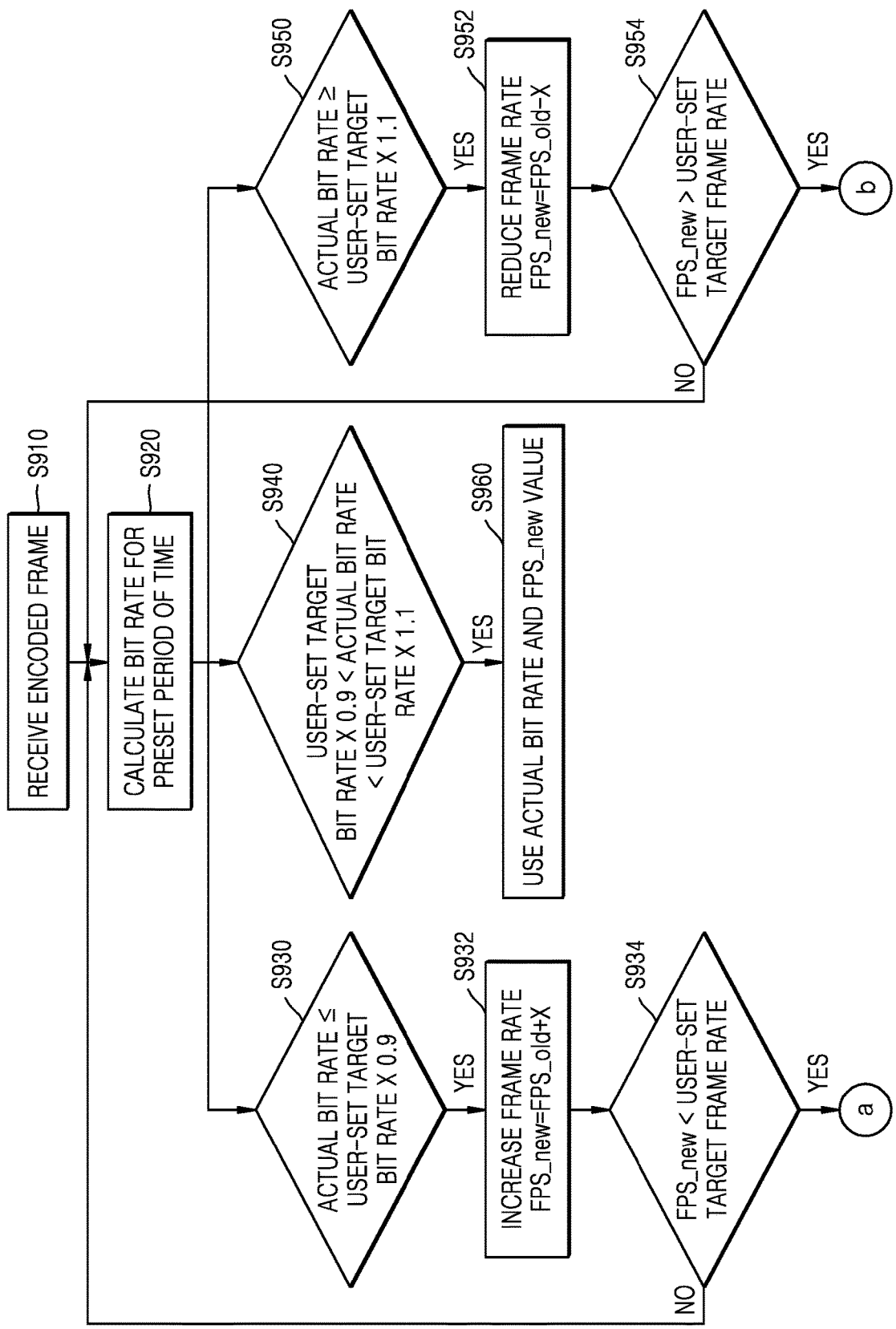
FIGS. 9A and 9B are flowcharts of a method performed by an imaging apparatus to improve MJPEG quality by controlling a frame rate and a quality factor according to another exemplary embodiment.

FIGS. 9A through 10 are charts for explaining a method performed by an imaging apparatus to control a frame rate and a quality factor according to another exemplary embodiment.

When a frame rate is within a margin range of a user-set target frame rate but an actual bit rate exceeds a margin range of +/−10% of a user-set target bit rate, the imaging apparatus 100 improves MJPEG quality by additionally sequentially increasing or reducing a quality factor.

Each exemplary embodiment will now be explained.

Referring to FIG. 7, in an exemplary embodiment, when a scene of an image received by an imaging apparatus 100 changes from normal to complex, the imaging apparatuses 100 improves MJPEG quality by reducing a frame rate in order to maintain image quality and maintain a user-set target bit rate.

In an exemplary embodiment, a controller 140 of the imaging apparatus 100 receives an encoded bitstream and detects an actual frame rate and an actual bit rate.

The exemplary embodiment of FIG. 7 is explained on the following assumption.

User-set resolution: FullHD (1920*1080)
User-set target bit rate: 5 mbps
User-set target frame rate: 10 fps
Preset quality factor QP: 60%
First frame rate=10 fps
First bit rate=20 mbps
Condition for complex image: 10 fps, 20 mbps, preset quality factor QP: 60%

The imaging apparatus 100 detects an actual bit rate of 20 mbps for 1000 msec at a time t1 (operations S710 and S711). Next, it is determined whether the actual bit rate is within a 10% margin range of a user-set target bit rate of 5 mbps (operation S712). In an exemplary embodiment, a method of determining whether the actual bit rate is within a margin range of +/−X % (X is a natural number) of the user-set target bit rate may be used as a method of determining whether the actual bit rate is within the margin range of the user-set target bit rate. For example, X may be 10.

The imaging apparatus 100 sequentially reduces a frame rate until the actual bit rate that is measured for a preset period of time, for example, 1000 msec is within the margin range of the user-set target bit rate.

When it is determined that the actual bit rate measured at the time t1 is 20 mbps and thus exceeds the 10% margin range of the user-set target bit rate of 5 mbps between 4.5 mbps and 5.5 mbps (operations S712 and S713), the imaging apparatus 100 reduces the frame rate. In this case, the imaging apparatus 100 determines that an input image is a complex image based on a first frame rate of 10 fps, and resets 9 fps that is obtained by reducing the first frame rate of 10 fps by 1 fps as a frame rate and uses the frame rate (operations S714 and S715). Although the frame rate is reduced by 1 fps in FIG. 7, various modifications may be made according to user settings.

Next, after the frame rate is reset to 9 fps, the imaging apparatus 100 measures a bit rate for a preset period of time, for example, 1000 msec, at a time t2 (operation S720). The imaging apparatus 100 determines whether the measured bit rate is within the margin range of the user-set target bit rate. When the measured bit rate exceeds the margin range of the user-set target bit rate, the imaging apparatus 100 reduces the frame rate. The imaging apparatus 100 reduces 9 fps that is used at the time t1 to 8 fps. Next, the imaging apparatus 100 repeatedly performs the above process a preset number of times or until the measured bit rate is within the range of the user-set target bit rate. When the measured bit rate is within the range of the user-set target bit rate, the imaging apparatus 100 performs pre-processing on an image to be transmitted to the user b using the frame rate.

As shown in FIG. 7, in an exemplary embodiment, when a scene of an image received by the imaging apparatus 100 changes from normal to complex, the imaging apparatus improves MJPEG by dynamically reducing a frame rate in order to maintain image quality and maintain a user-set target bit rate.

FIG. 8 is a chart illustrating a case where a scene of an image received by an imaging apparatus 100 changes from complex to normal according to another exemplary embodiment. In this case, the imaging apparatus 100 improves MJPEG quality by increasing a frame rate in order to maintain image quality and maintain a user-set target bit rate.

The exemplary embodiment of FIG. 8 is explained on the following assumption.

User-set resolution: FullHD (1920*1080)
User-set target bit rate: 5 mbps
User-set target frame rate: 10 fps
Preset quality factor QP: 60%
First frame rate=10 fps
First bit rate=20 mbps
Condition for complex image: 4 fps, 5 mbps, preset quality factor QP: 60%
Condition for normal image: 4 fps, 3 mbps, preset quality factor QP: 60%

The imaging apparatus 100 measures an actual bit rate of 3 mbps for a preset period of time, for example, 1000 msec. The imaging apparatus 100 may determine whether an image is a normal image or a complex image based on the measured actual bit rate. The imaging apparatus 100 determines whether an input image is a normal image based on a first bit rate of 3 mbps, and determines whether a bit rate is within a range of a user-set target bit rate.

When it is determined that a bit rate is within a range of a user-set maximum bit rate of 5 mbps (operation S812), it is determined whether the bit rate is within a range of 90% of a user-set target bit rate (operation S813). Although the range of 90% of the user-set target bit rate is used, various modifications may be made, for example, a range of 80% or 70% may be used.

Referring to FIG. 8, when an actual bit rate measured at a time t1 is 3 bps (operation S811) and it is determined that the actual bit rate measured at the time t1 is beyond a margin range of a user-set target bit rate of 5 mbps (operation S812), the imaging apparatus increases a frame rate (operation S814).

In this case, the imaging apparatus 100 resets 5 fps obtained by increasing the first frame rate of 4 fps by 1 fps as a frame rate and uses the frame rate (operations S814 and S815). Although the frame rate is increased by 1 fps in FIG. 8, various modifications may be made according to user settings.

Next, the imaging apparatus 100 measures a bit rate for a preset period of time, for example, 1000 msec at a time t2 (operation S820). The imaging apparatus 100 determines whether the measured bit rate is within the margin range of the user-set target bit rate. When the measured bit rate exceeds the margin range of the user-set target bit rate, the imaging apparatus 100 increases the frame rate. The imaging apparatus 100 increases 5 fps that is used at the time t2 and resets the frame rate to 6 fps.

Next, the imaging apparatus 100 repeatedly performs the above process a preset number of times or until the measured bit rate is within a range of 90% of the user-set target bit rate (operation S830). When the measured bit rate is within the range of 90% of the user-set target bit rate, the imaging apparatus transmits a user-set image at the frame rate.

As shown in FIG. 8, in an exemplary embodiment, when a scene of an image received by the imaging apparatus 100 changes from complex to normal, the imaging apparatus 100 improves MJPEG quality by dynamically changing a frame rate in order to maintain image quality and maintain a user-set target bit rate. In the exemplary embodiment of FIG. 8, the imaging apparatus 100 improves MJPEG quality by sequentially increasing a frame rate.

Figure 9B:
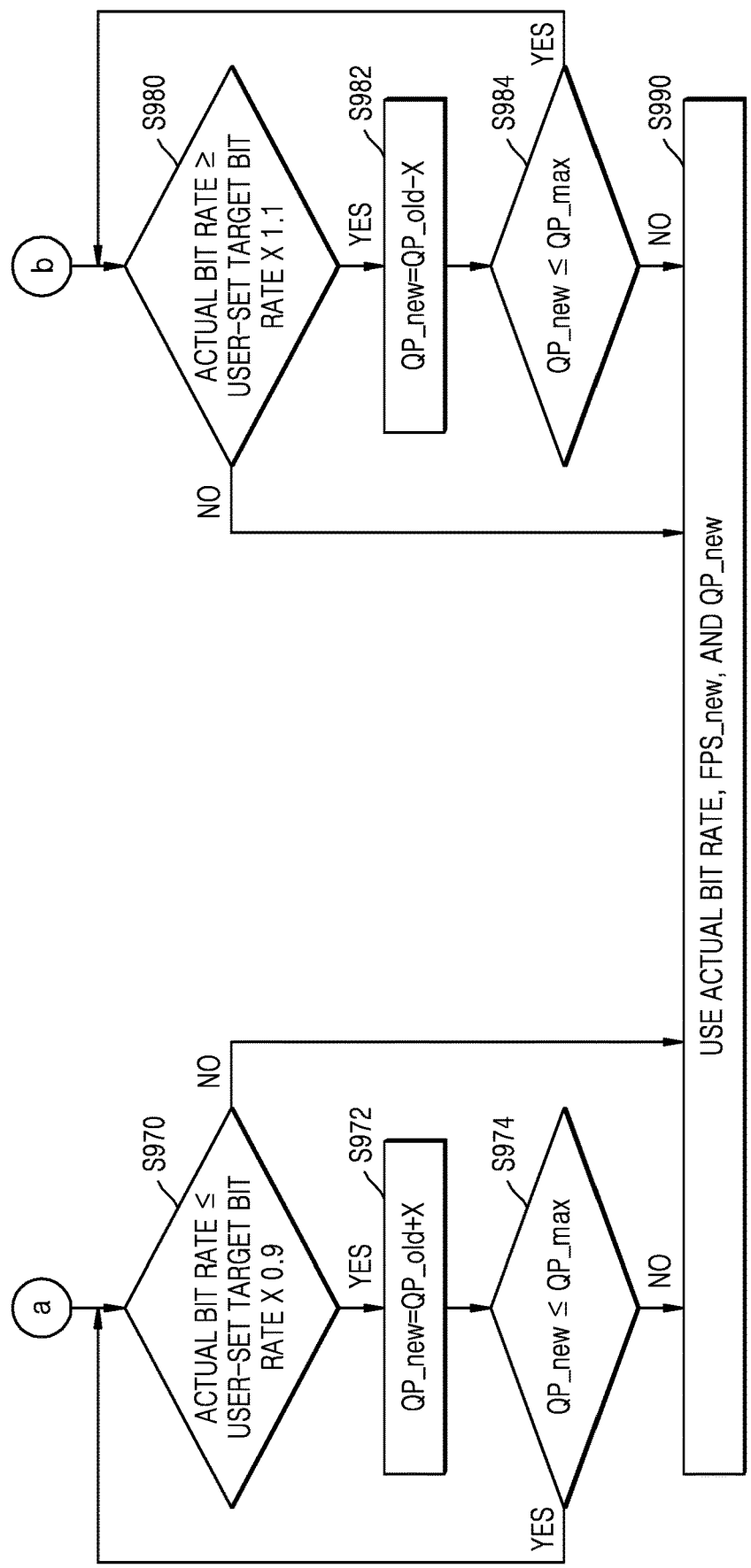

In another exemplary embodiment, when a scene of an image received by the imaging apparatus 100 changes from complex to simple, the imaging apparatus 100 increases a frame rate in order to maintain preset image quality and maintain a user-set target bit rate. In this case, when the increased frame rate is less than a user-set target frame rate, the imaging apparatus 100 improves MJPEG quality by additionally increasing a preset quality factor. An exemplary embodiment of FIGS. 9A and 9B is as follows.

When an imaging apparatus 100 receives a complex scene of an image and the complex image of the image is changed to a simple scene, the imaging apparatus 100 calculates an actual bit rate for a preset period of time, for example, 1000 msec (operations S910 and S920). Next, the imaging apparatus 100 determines whether the actual bit rate is within a margin range of +/−10% of a user-set target bit rate (operations S930, S940, and S950). In general, since an actual bit rate of a simple image is 20% or more less than a user-set target bit rate, the imaging apparatus 100 sequentially increases a frame rate until the actual bit rate reaches the user-set target bit rate (operations S930, S932, and S934).

When the actual bit rate is within the 10% margin range of the user-set target bit rate (operations S940 and S960) or when the actual bit rate exceeds the 10% margin range of the user-set target bit rate (operations S950, S952, S954, and S960), the imaging apparatus 100 operates substantially in the same manner as that in FIG. 6.

However, before the actual bit rate reaches the user-set target bit rate, the frame rate may first reach a user-set target frame rate (operation S970).

When the frame rate reaches the user-set target frame rate, the imaging apparatus 100 sequentially increases a quality factor from a preset quality factor by a preset range of X % (X is a natural number, e.g., 5%) to a maximum value (operations S972 and S974). For example, when the preset quality factor is 60%, the imaging apparatus may sequentially increase the quality factor to 60%, to 65%, and to 70%. In this process, when the actual bit rate reaches the user-set target bit rate, the quality factor is no longer increased (operation S981).

Although it is determined whether the actual bit rate is within the margin range of +/−10% of the user-set target bit rate in FIG. 9, various modifications may be made, for example, it may be determined whether the actual bit rate is within a margin range of +/−X (X is a natural number) %.

FIG. 10 is a chart illustrating a case where a scene of an image received by an imaging apparatus changes from normal to simple. Even in this case, like in FIGS. 9A and 9B, the imaging apparatus increases a frame rate in order to maintain image quality and maintain a user-set target bit rate. When the frame rate reaches a user-set target frame rate, the imaging apparatus 100 may improve MJPEG quality by additionally increasing a preset quality factor.

An exemplary embodiment of FIG. 10 is explained on the following assumption (operation S1010).

User-set resolution: FullHD (1920*1080)
User-set target bit rate: 30 mbps
User-set target frame rate: 30 fps
Preset quality factor QP: 60%, maximum quality factor QP_max: 98%
First frame rate=30 fps
First bit rate=20 mbps In this case, after there is a request from a user, when a bit rate of an image received by an imaging apparatus 100 is equal to or less than a preset range of a user-set target bit rate, the imaging apparatus 100 determines that a scene of the input image is a simple scene. For example, when an actual bit rate is equal to or less than −20% of a user-set target bit rate, the imaging apparatus 100 may determine that a scene of an input image is a simple scene.

Since a bit rate of 20 mbps of an input image is equal to or less than 20% of a user-set target bit rate of 30 mbps, the imaging apparatus 100 may determine that a scene of the input image is a simple scene.

In an exemplary embodiment of FIG. 10, since the bit rate of 20 mbps of the input image exceeds a margin range of +/−10% of the user-set target bit rate of 30 mbps (operations S1012 and S1013), the imaging apparatus 100 increases a frame rate. However, since a frame rate of an input stream is 30 fps and thus is the same as the user-set target bit rate of 30 mbps, the imaging apparatus 100 may not dynamically increase the frame rate (operation S1020).

In an exemplary embodiment, when a bit rate of an input stream does not reach a user-set target bit rate but a frame rate of the input stream reaches a user-set target frame rate and thus a frame rate may not be increased, the imaging apparatus 100 may additionally increase a quality factor (operation S1040).

Since a preset quality factor of 60% does not reach a maximum quality factor of 98% in FIG. 10 (operation S1030), the imaging apparatus sequentially increases a quality factor and uses the increased quality factor. For example, when the quality factor is sequentially increased by 1% (operation S1040), the imaging apparatus may sequentially increase the quality factor to 61%, 62%, 63%, . . . as long as a bit rate and a frame rate are respectively within ranges of a user-set target bit rate and a user-set target frame rate and may use a finally increased quality factor of 92% (operations S970, S972, S974, and S990 of FIG. 9).

Next, when a scene of an image received in a state where the quality factor is increased to 92% changes from a simple scene to a normal scene or changes from a simple scene to a complex scene, the imaging apparatus 100 may sequentially reduce the increased quality factor to the preset quality factor (operations S980, S982, S984, and S990 of FIG. 9).

A case where a scene changes from a simple scene to a normal scene is as follows. The imaging apparatus 100 calculates an actual bit rate of a received stream for 1000 msec. Next, the imaging apparatus 100 determines whether the actual bit rate is within a margin range of a user-set target bit rate. In a normal image, since the actual bit rate is greater than the user-set target bit rate by 10% or more, when a frame rate exceeds a user-set range, the imaging apparatus 100 reduces the frame rate. However, when the frame rate is within the user-set range, the imaging apparatus improves MJPEG quality by sequentially reducing a quality factor.

Next, a case where a scene changes from a simple scene to a complex scene is as follows. The imaging apparatus 100 calculates an actual bit rate of a received stream for 1000 msec. In this case, since an image is received by using a quality factor that is increased to 92%, the actual bit rate is greater than a user-set target bit rate by 20% or more. In this case, the imaging apparatus 100 reduces the actual bit rate to the user-set target bit rate by sequentially reducing a current quality factor to a preset quality factor. In this case, even after the current quality factor is reduced to the preset quality factor, when the actual bit rate is greater than the user-set target bit rate, the imaging apparatus 100 may additionally and sequentially reduce a frame rate to a preset frame rate.

Figure 11:
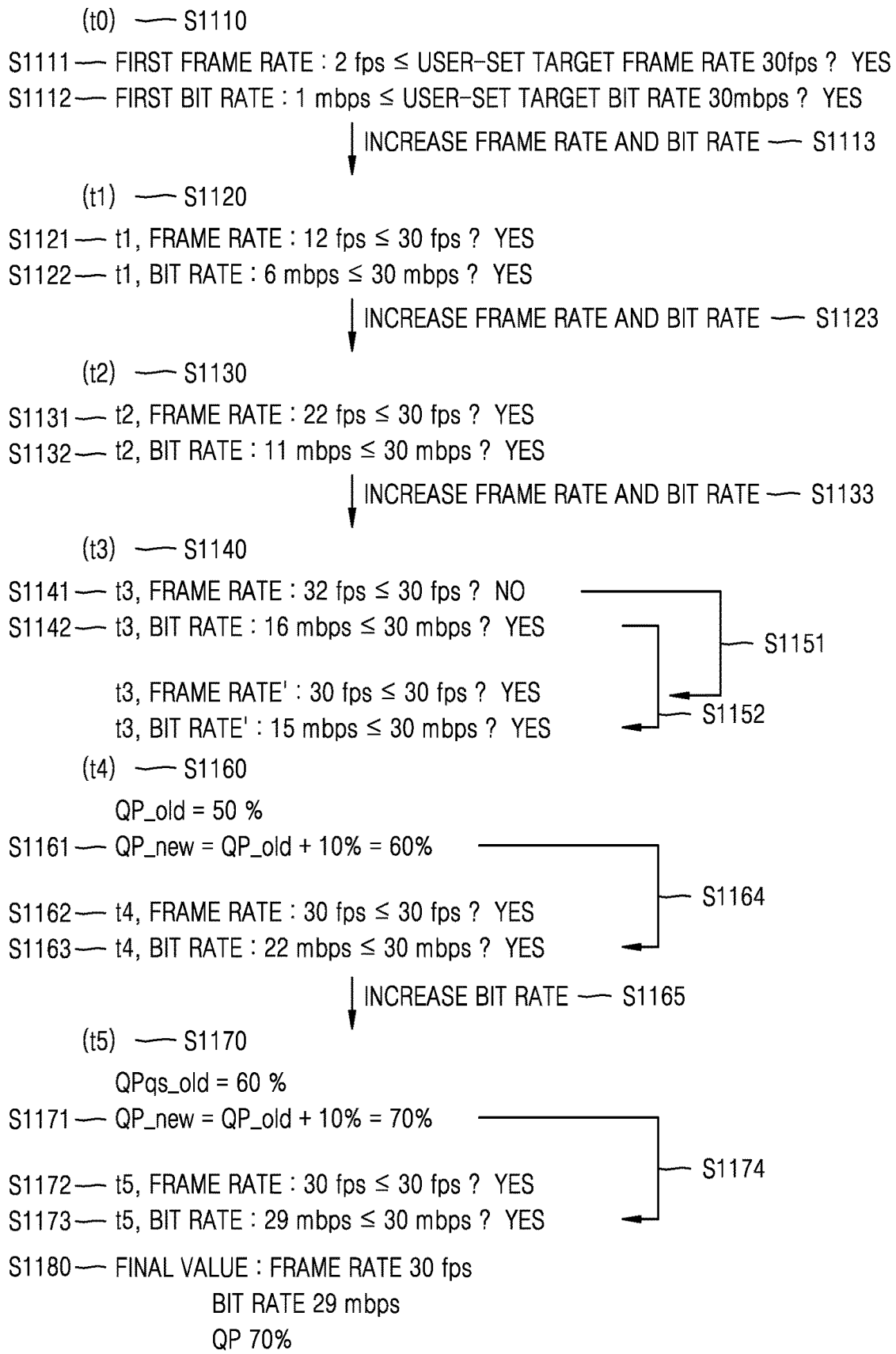
FIG. 11 is a chart for explaining a method performed by an imaging apparatus to control both a bitstream and a frame rate and to additionally control a quality factor when both the bitstream and the frame rate reach user-set ranges according to another exemplary embodiment.

FIG. 11 is a chart for explaining a method performed by an imaging apparatus to improve MJPEG quality based on three variables, that is, a frame rate, a bit rate, and a quality factor, according to another exemplary embodiment.

In greater detail, the imaging apparatus 100 determines whether an actual frame rate and an actual bit rate that are first measured are within margin ranges of a user-set target frame rate and a user-set target bit range, and then improves MJPEG quality by increasing a frame rate and a bit rate to maximum values within user-set ranges and additionally increasing a quality factor.

The imaging apparatus 100 receives an encoded bitstream and detects a frame rate and a bit rate.

t0: (operation S1110)
preset quality factor QP: 50%
first frame rate=2 fps
first bit rate=1 mbps A controller 140 calculates a bit rate requested for every 1 frame rate based on a first frame rate and a first bit rate. In this case, it is calculated that a bit rate of 0.5 mbps is requested for every 1 frame rate.

Next, it is determined whether the frame rate and the bit rate exceed user-set values.

t0: (operation S1110)
2 fps≤30 fps (operation S1111)
1 mbps≤30 mbps (operation S1112)

When the frame rate and the bit rate do not exceed the user-set values, in the imaging apparatus increases the frame rate by preset X (operation S1113). In an exemplary embodiment, X may be set to 10 fps. However, the present exemplary embodiment is not limited thereto, and various modifications may be made.

In this case, 2 fps at a time t0 is increased to 12 fps at a time t1. Also, the bit rate is increased to be proportional to the increased fps. Since the controller 140 determines that a bit rate of 0.5 mbps is requested for every 1 frame rate, when the frame rate is increased by 10 fps, the bit rate is increased by 5 mbps to 6 mbps. Next, the imaging apparatus 100 determines whether the frame rate and the bit rate exceed the user-set values.

t1: (operation S1120)
t1, frame rate=12 fps
t1, bit rate=6 mbps
t1, frame rate=12 fps≤30 fps (operation S1121)
t1, bit rate=6 mbps≤30 mbps (operation S1122)

The controller 140 increases the frame rate or the bit rate in the same manner (operation S1123). The imaging apparatus 100 may increase a parameter that exceeds a user-set range or has a smaller difference with the user-set range from among the frame rate and the bit rate. Alternatively, the imaging apparatus 100 may adjust the frame rate with a higher priority than an adjustment of the bit rate, and vice versa. The imaging apparatus 100 may select the frame rate or the bit rate according to a policy and may increase the selected one by a preset value.

t2: (operation S1130)
t2, frame rate=22 fps
t2, bit rate=11 mbps
t2, frame rate=22 fps≤30 fps (operation S1131)
t2, bit rate=11 mbps≤30 mbps (operation S1132)

In this case, in an exemplary embodiment, since a difference between the frame rate and a user-set target frame rate at a time t2 is less than a difference between the bit rate and a user-set target bit rate at the time t2, the imaging apparatus 100 may be set to increase the frame rate (operation S1133).

t3: (operation S1140)
t3, frame rate=30 fps
t3, bit rate=15 mbps
t3, frame rate=32 fps≤30 fps (operation S1151)
t3, bit rate=15 mbps≤30 mbps (operation S1152)

When the frame rate is to be increased by 10 fps at a time 3, the frame rate exceeds the user-set value (operations S1141 and S1142). In this case, when the frame rate exceeds a limit value of 30 fps, the imaging apparatus 100 may increase the frame rate by a difference between the limit value and the frame rate, that is, 30 fps−22 fps=8 fps. Also, since a bit rate of 0.5 mbps is required for every 1 fps, the imaging apparatus increases the bit rate by 4 mbps (operations S1151 and S1152).

As a result, the frame rate is 30 fps and the bit rate is 15 mbps at the time t3, and thus the frame rate reaches the user-set target frame rate at the time t3. However, the bit rate may be additionally increased by as much as 15 mbps.

In an exemplary embodiment, when the frame rate first reaches the limit value from among the frame rate and the bit rate, the imaging apparatus 100 may regard an image included in the bitstream as a simple image.

The imaging apparatus 100 may additionally increase a quality factor of the image. A detailed example is as follows. A preset quality factor QP at a time t0 is 50%.

t4: (operation S1160)

$$QP_{new} = QP_{old} + Y = 60\%$$

Y is a preset increment. For example, Y is 10%. In an exemplary embodiment, since a first set value of a quality factor $QP_{old}$ is 50% and the preset increment is 10%, a quality factor $QP_{new}$ is 60% (operation S1161).

In this case, the imaging apparatus 100 calculates a new bit rate of a bitstream based on the quality factor $QP_{new}$ that is automatically changed. That is, the imaging apparatus 100 calculates an encoded packet size of a current bitstream based on the quality factor $QP_{new}$ to obtain a new bit rate (operation S1164).

For example, when the quality factor $QP_{new}$ is 60%, the bit rate is changed from 15 mbps at the time t3 to 22 mbps at a time t4 (operation S1163).

The imaging apparatus 100 determines whether the frame rate and the bit rate reach the user-set limit values.

t4: (operation S1160)
$QP_{new}$=60% (operation S1161)
t4, frame rate=30 fps≤30 fps (operation S1162)
t4, bit rate=22 mbps≤30 mbps (operation S1163)

Since the bit rate does not reach the user-set limit value, the imaging apparatus 100 increases the quality factor. The imaging apparatus 100 calculates calculating the encoded packet size of the current bitstream based on the quality factor $QP_{new}$ to obtain a new bit rate (operation S1174).

t5: (operation S1170)
$QP_{new}$=70% (operation S1171)
t5, frame rate=30 fps≤30 fps (operation S1172)
t5, bit rate=29 mbps≤30 mbps (operation S1173)

In this case, since the bit rate does not reach the user-set limit value, the imaging apparatus 100 increases the quality factor. However, when the quality factor is increased by the preset increment Y=10, the bit rate may be 36 mbps and may exceed the user-set limit value.

In this case, in an exemplary embodiment, the controller 140 may proceed to a time t5 without increasing the quality factor. Alternatively, the controller 140 may increase the quality factor by as much as 1 mbps by which the bit rate may be increased. However, since the quality factor is increased by 7/10 (=0.7), in this case, the imaging apparatus 100 increases the quality factor by 0 because an increment is less than 1. The imaging apparatus 100 improves MJPEG quality based on the quality factor $QP_{new}$ of 70%, 30 fps, and 29 mbps.

FIG. 12 is a chart for explaining pattern comparison for dynamically adjusting a frame rate or a quality factor according to an exemplary embodiment.

In another exemplary embodiment, the imaging apparatus may perform pattern comparison in order to maintain a frame rate or a quality factor within a preset range or a user-set range.

When a preset pattern is matched to a temporary pattern, the imaging apparatus 100 does not additionally adjust a frame rate or a quality factor. That is, when the preset pattern and the temporary pattern are matched to each other, the imaging apparatus 100 uses the frame rate and the quality factor.

Referring to FIG. 12, the imaging apparatus 100 measures an actual bit rate for first 1000 msec (operation S1210) and determines whether the measured actual bit rate is less than 90% of a user-set target bit rate (operation S1211). When it is determined that the measured bit rate is less than 90% of the user-set target bit rate, the imaging apparatus 100 sets a temporary pattern to 0x0A (operation S1212). When it is determined that the measured bit rate is not less than 90% of the user-set target bit rate, the imaging apparatus 100 does not set an additional pattern.

Next, the imaging apparatus 100 measures an actual bit rate for 1000 msec (operation S1220) and determines whether the measured bit rate exceeds 10% margin of the user-set target bit rate (operation S1221). When it is determined that the measured bit rate 110% of the user-set target bit rate, the imaging apparatus 100 sets a temporary pattern to 0x0B (operation S1222). When it is determined that the measured bit rate does not exceed the 10% margin of the user-set target bit rate, the imaging apparatus 100 does not set an additional pattern.

Next, the imaging apparatus 100 measures an actual bit rate for 1000 msec (operation S1230) and determines whether the measured bit rate is less than 90% of the user-set target bit rate (operation S1231). When it is determined that the measured bit rate is less than 90% of the user-set target bit rate, the imaging apparatus 100 sets a temporary pattern to 0x0A (operation S1232). When it is determined that the measured bit rate is not less than 10% of the user-set target bit rate, the imaging apparatus 100 does not set an additional pattern.

Next, the imaging apparatus 100 measures an actual bit rate for 1000 msec (operation S1240) and determines whether the measured bit rate exceeds the 10% margin of the user-set target bit rate (operation S1241). When it is determined that the measured bit rate exceeds 110% of the user-set target bit rate, the imaging apparatus 100 sets a temporary pattern to 0x0B (operation S1242). When it is determined that the measured bit rate does not exceed 110% of the user-set target bit rate, the imaging apparatus 100 does not set an additional pattern.

FIG. 13 is a detailed chart of FIG. 11 according to an exemplary embodiment.

An exemplary embodiment of FIG. 13 is explained on the following assumption.

User-set resolution: FullHD (1920*1080)
User-set target bit rate: 7 mbps
User-set target frame rate: 5 fps
Preset quality factor QP: 60%
Preset pattern: 0x0A0B0A0B and 0x0B0A0B0A
Initial temporary pattern: 0xFFFFFFFF (in this case, F denotes a null value)

Also, it is assumed that 2 mbps are required to transmit one frame.

In an exemplary embodiment, an imaging apparatus may use a frame rate when the preset pattern is satisfied.

(t1) (operation S1310)
Bit rate calculated for 1000 msec: 8 mbps
Frame rate: 4 fps The imaging apparatus 100 determines whether a bit rate of 8 mbps exceeds a 10% margin of a user-set target bit rate (operation S1311). When it is determined that 8 mbps is greater than or equal to 110% of the user-set target bit rate, the imaging apparatus 100 sets a temporary pattern to 0x0AFFFFFF (operation S1312), and determines whether the set temporary pattern is the same as a preset pattern 0x0A0B0A0B or 0x0B0A0B0A. When it is determined that the temporary pattern is not the same as the preset pattern 0x0A0B0A0B or 0x0B0A0B0A, the imaging apparatus 100 reduces a frame rate to 3 fps and calculates the bit rate for next 1000 msec (operation S1313).

(t2) (operation S1320)
Bit rate calculated for 1000 msec: 6 mbps
Frame rate: 3 fps It is determined whether a bit rate of 6 mbps is less than or equal to 90% of the user-set target bit rate (operation S1321). When it is determined that the bit rate of 6 mbps is less than or equal to 90% of the user-set target bit rate, the imaging apparatus 100 sets a temporary pattern to 0x0A0BFFFF (operation S1322), and determines whether the temporary pattern is the same as a preset pattern 0x0A0B0A0B or 0x0B0A0B0A. When it is determined that the temporary pattern is not the same as the preset pattern 0x0A0B0A0B or 0x0B0A0B0A, the imaging apparatus 100 increases the frame rate to 4 fps and calculates the bit rate for next 1000 msec (operation S1323).

(t3) (operation S1330)
Bit rate calculated for 1000 msec: 8 mbps
Frame rate: 4 fps It is determined whether a bit rate of 8 mbps exceeds the 10% margin of the user-set target bit rate (operation S1331). When it is determined that the bit rate of 8 mbps is greater than or equal to 110% of the user-set target bit rate, the imaging apparatus 100 sets a temporary pattern to 0x0A0B0AFF (operation S1332), and determines whether the temporary pattern is the same as a set pattern 0x0A0B0A0B or 0x0B0A0B0A. When it is determined that the temporary pattern is not the same as the set pattern 0x0A0B0A0B or 0x0B0A0B0A, the imaging apparatus 100 reduces the frame rate to 3 fps, and then calculates the bit rate for next 1000 msec (operation S1333).

(t4) (operation S1340)
Bit rate calculated for 1000 msec: 6 mbps
Frame rate: 3 fps It is determined whether a bit rate of 6 mbps is less than or equal to 90% of the user-set target bit rate (operation S1341). When it is determined that the bit rate of 6 mbps is less than or equal to 90% of the user-set target bit rate, the imaging apparatus 100 sets a temporary pattern to 0x0A0B0A0B (operation S1342), and determines whether the temporary pattern is the same as a preset pattern 0x0A0B0A0B or 0x0B0A0B0A. Since the temporary pattern is not the same as the preset pattern 0x0A0B0A0B or 0x0B0A0B0A, the imaging apparatus 100 determines a current frame rate of 3 fps as a final value and uses the final value (operation S1343).

In an exemplary embodiment, although the imaging apparatus 100 uses a frame rate when a temporary pattern is the same as a preset pattern, when a bit rate of an input image after a predetermined period of time is calculated to be equal to or less than a preset value (e.g., 20%) of a user-set target bit rate, the imaging apparatus 100 may additionally change the frame rate or a quality factor.

FIGS. 14A through 15B are graphs illustrating a bit rate when a monitored image is provided according to a conventional method of providing a monitored image and a bit rate when a monitored image is provided according to a method performed by an imaging apparatus 100 using an MJPEG compression method according to an embodiment to provide a monitored image in a bandwidth requested by a user.

Figure 14A:
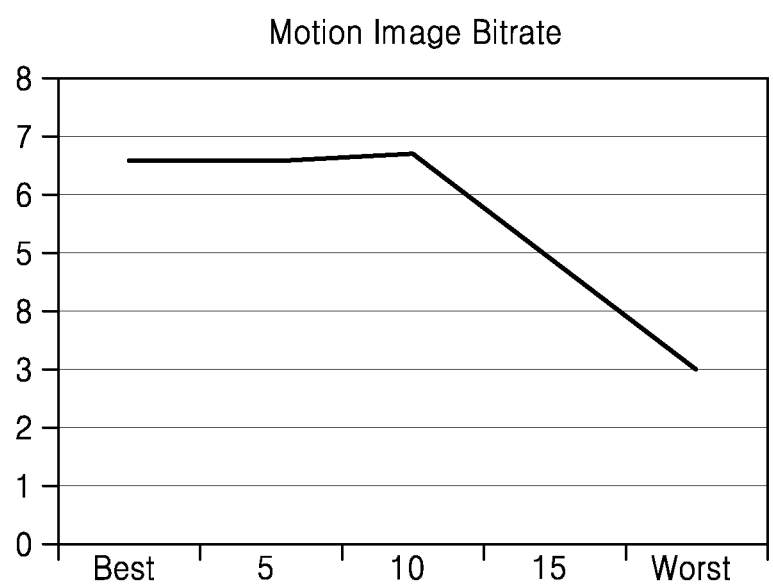
FIGS. 14A, 14B, 15A, and 15B are graphs illustrating a bit rate when a monitored image is provided according to a conventional method of providing a monitored image and a bit rate when a monitored image is provided according to a method performed by an imaging apparatus using an MJPEG compression method according to an exemplary embodiment to provide a monitored image in a bandwidth requested by a user.
Figure 14B:
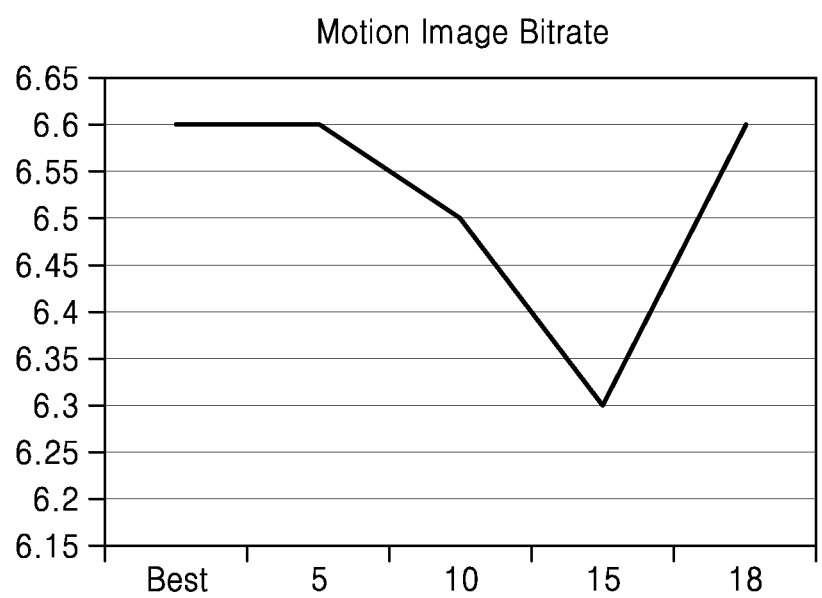

In an embodiment, when a complexity of an image changes from complex to normal, a bit rate of the image may be less than a target bit rate requested by a user as shown in FIG. 14A. In this case, in an embodiment, when a complexity of an image changes from complex to normal, the imaging apparatuses 100 increases a bit rate of the image to a preset bit rate as shown in FIG. 14B. When the bit rate of the image may no longer be increased due to a preset bit rate limit value, the imaging apparatus 100 increases a quality factor until a preset bit rate condition requested by the user is satisfied within a maximum limit range.

Figure 15A:
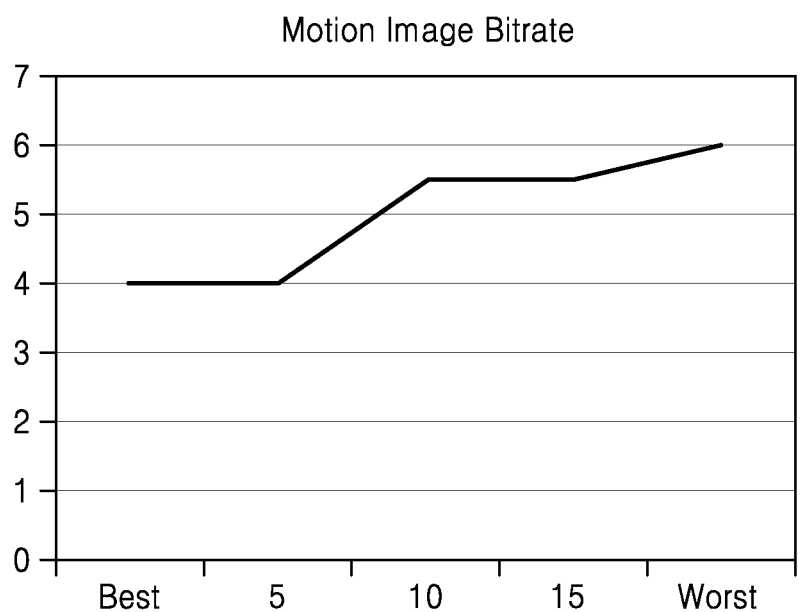
Figure 15B:
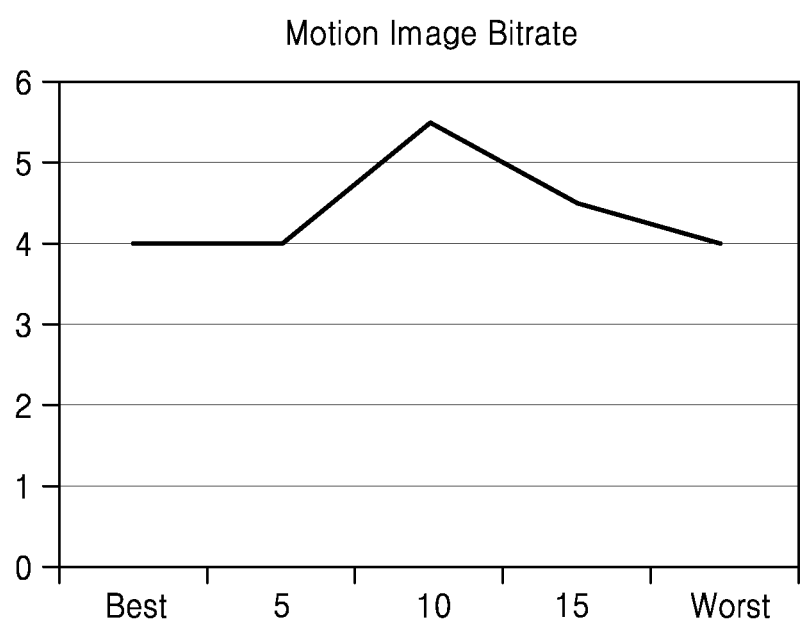

In another embodiment, when a complexity of an image changes from normal to complex, a bit rate of the image may be greater than a target bit rate requested by a user as shown in FIG. 15A. In this case, in an embodiment, when a complexity of an image changes from normal to complex, the imaging apparatus 100 reduces a bit rate of the image to a preset bit rate as shown in FIG. 15B.

According to the one or more embodiments, an imaging apparatus 100 compares a bit rate of a bitstream for a preset period of time, for example, 1000 msec, with a user-set target bit rate in order to reach the bit rate to the user-set target bit rate and increases or reduces a frame rate within a range of a user-set target frame rate, thereby improving MJPEG quality.

Also, when the bit rate does not reach the user-set target bit rate or the frame rate may not be increased or reduced, the imaging apparatus 100 additionally increases or reduces a quality factor of the bitstream, thereby improving JPEG quality. Accordingly, a user-set bit rate condition may be satisfied and image quality may be maintained.

While not restricted thereto, the operations or steps of the methods or algorithms according to the above exemplary embodiments may be embodied as computer-readable codes on a computer-readable recording medium. The computer-readable recording medium may be any recording apparatus capable of storing data that is read by a computer system. Examples of the computer-readable recording medium include read-only memories (ROMs), random-access memories (RAMs), CD-ROMs, magnetic tapes, floppy disks, and optical data storage devices. The computer-readable recording medium may be a carrier wave that transmits data via the Internet, for example. The computer-readable medium may be distributed among computer systems that are interconnected through a network so that the computer-readable code is stored and executed in a distributed fashion. Also, the operations or steps of the methods or algorithms according to the above exemplary embodiments may be written as a computer program transmitted over a computer-readable transmission medium, such as a carrier wave, and received and implemented in general-use or special-purpose digital computers that execute the programs. Moreover, it is understood that in exemplary embodiments, one or more units (e.g., those represented by a block as illustrated in FIG. 2) of the above-described apparatuses and devices can include or implemented by circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method performed by an imaging apparatus to improve motion JPEG (MJPEG) quality, the method comprising:
    calculating, by a frame rate controller, an actual bit rate of an encoded image for a preset period of time;
    comparing, by the frame rate controller, a user-set target bit rate with the calculated actual bit rate;
    adjusting, by the frame rate controller, a frame rate of the encoded image according to a result of the comparison, wherein the adjusting includes increasing the frame rate when the actual bit rate is less than a predetermined margin range of the user-set bit rate and decreasing the frame rate when the calculated actual bit rate is greater than the predetermined margin range of the user-set bit rate in order to improve image quality;
    outputting, by the frame rate controller, the adjusted encoded image signal; and wherein adjusting the frame rate of the encoded image according to a result of the comparison comprises:

increasing the frame rate when the actual bit rate is less than the user-set bit rate by a predetermined margin range until the actual bit rate is either within the predetermined margin range of the user-set bit rate or the frame rate reaches a user-set target frame rate, and decreasing the frame rate when the calculated actual bit rate is greater than the predetermined margin range until the actual bit rate is either within the predetermined margin range of the user-set bit rate or the frame rate reaches the user-set target frame rate, wherein, when increasing the frame rate, the frame rate is sequentially increased by X frames, where X is a natural number greater than 0, until the actual bit rate is either within the predetermined margin range of the user-set bit rate or the frame rate reaches a user-set target frame rate, and when decreasing the frame rate, the frame rate is sequentially decreased by X frames, where X is a natural number greater than 0, until the actual bit rate is either within the predetermined margin range of the user-set bit rate or the frame rate reaches the user-set target frame rate.

2. A method performed by an imaging apparatus to improve motion JPEG (MJPEG) quality, the method comprising:

calculating, by a frame rate controller, an actual bit rate of an encoded image for a preset period of time;

comparing, by the frame rate controller, a user-set target bit rate with the calculated actual bit rate;

adjusting, by the frame rate controller, a frame rate of the encoded image according to a result of the comparison, wherein the adjusting includes increasing the frame rate when the actual bit rate is less than a predetermined margin range of the user-set bit rate and decreasing the frame rate when the calculated actual bit rate is greater than the predetermined margin range of the user-set bit rate in order to improve image quality;

outputting, by the frame rate controller, the adjusted encoded image signal; and wherein adjusting the frame rate of the encoded image according to a result of the comparison comprises:

increasing the frame rate when the actual bit rate is less than the user-set bit rate by a predetermined margin range until the actual bit rate is either within the predetermined margin range of the user-set bit rate or the frame rate reaches a user-set target frame rate, and decreasing the frame rate when the calculated actual bit rate is greater than the predetermined margin range until the actual bit rate is either within the predetermined margin range of the user-set bit rate or the frame rate reaches the user-set target frame rate, further comprising adjusting a motion JPEG (MJPEG) quality factor until the actual bit rate is within the predetermined margin range of the user-set bit rate when the actual frame rate reaches the user-set target frame rate and the actual bit rate is not within the predetermined margin range of the user-set bit rate.

3. An imaging apparatus comprising:

a re-sizer configured to re-size an image to a predetermined size;

an encoder configured to encode the re-sized image;

a frame rate controller configured to calculate an actual bit rate of the encoded image for a preset period of time, compare a user-set target bit rate with the calculated actual bit rate, adjust a frame rate of the encoded image according to a result of the comparison, and output an encoded image signal at a user-set target bit rate irrespective of a complexity of the encoded image; and wherein the re-sizer, encoder, and frame rate controller are located separately from each other, wherein the frame rate controller is further configured to, in response to the actual bit rate being less than the user-set target bit rate by X %, increase the frame rate of the encoded image, X being a natural number.

4. An imaging apparatus comprising:

a re-sizer configured to re-size an image to a predetermined size;

an encoder configured to encode the re-sized image;

a frame rate controller configured to calculate an actual bit rate of the encoded image for a preset period of time, compare a user-set target bit rate with the calculated actual bit rate, adjust a frame rate of the encoded image according to a result of the comparison, and output an encoded image signal at a user-set target bit rate irrespective of a complexity of the encoded image; and wherein the re-sizer, encoder, and frame rate controller are located separately from each other, wherein the frame rate controller is further configured to generate a temporary pattern in response to a result of the comparison satisfying a preset condition whenever the user-set target bit rate is compared with the actual bit rate, wherein the frame rate controller is further configured to generate a dynamic frame rate by adjusting the frame rate of the encoded image according to the result of the comparison, and wherein the frame rate controller is further configured to perform pre-processing on the encoded image at the actual bit rate and the dynamic frame rate in response to the temporary pattern being equal to a preset pattern.

5. The imaging apparatus of claim 4, wherein the preset condition is satisfied when the actual bit rate is greater than the user-set target bit rate by X % or the actual bit rate is less than the user-set target bit rate by Y %, each of X and Y being a natural number.

* * * * *